US010064025B2

(12) United States Patent
Lewis et al.

(10) Patent No.: US 10,064,025 B2
(45) Date of Patent: Aug. 28, 2018

(54) OFFLINE PEER-ASSISTED NOTIFICATION DELIVERY

(71) Applicant: Google Inc., Mountain View, CA (US)

(72) Inventors: Justin Lewis, Mountain View, CA (US); Robert Durbin, Mountain View, CA (US)

(73) Assignee: Google LLC, Mountain View, CA (US)

(*) Notice: Subject to any disclaimer, the term of this patent is extended or adjusted under 35 U.S.C. 154(b) by 3 days.

(21) Appl. No.: 15/210,843

(22) Filed: Jul. 14, 2016

(65) Prior Publication Data

US 2017/0339536 A1 Nov. 23, 2017

Related U.S. Application Data

(60) Provisional application No. 62/337,700, filed on May 17, 2016.

(51) Int. Cl.
H04W 4/12 (2009.01)
H04W 64/00 (2009.01)
(Continued)

(52) U.S. Cl.
CPC ............ H04W 4/12 (2013.01); H04W 4/008 (2013.01); H04W 52/0209 (2013.01); H04W 64/003 (2013.01); H04W 68/02 (2013.01)

(58) Field of Classification Search
CPC .......... H04L 12/58; G06F 15/16; H04W 4/12; H04W 64/003; H04W 64/00;
(Continued)

(56) References Cited

U.S. PATENT DOCUMENTS 9,179,256 B1 11/2015 Pietraniec
2007/0296805 A1 12/2007 Tedenvall et al.
(Continued)

FOREIGN PATENT DOCUMENTS

EP 2254309 A1 11/2010
JP 2009164783 A 7/2009
(Continued)

OTHER PUBLICATIONS

International Search Report and Written Opinion of International Application No. PCT/US2016/068965, dated Mar. 22, 2017, 14 pp.
(Continued)

Primary Examiner — Frantz Bataille
(74) Attorney, Agent, or Firm — Shumaker & Sieffert, P.A.

(57) ABSTRACT

In general, this disclosure is directed to techniques for sending notification data to computing devices that are unable to receive the notification data from a central server. A server device may receive notification data for a notification account that is associated with a computing device and determine that the computing device is currently offline. The server device may then identify a group of one or more sharing devices and send a notification package to a sharing device of the group, wherein the notification package includes the notification data, an account identifier associated with the notification account, and a device identifier associated with the computing device. The sharing device may receive the notification package and, responsive to determining that a device identifier for the computing device matches the device identifier in the notification package, forward the notification data to the computing device.

7 Claims, 6 Drawing Sheets

(51) Int. Cl.
*H04W 68/02* (2009.01)
*H04W 4/00* (2018.01)
*H04W 52/02* (2009.01)

(58) Field of Classification Search
CPC . H04W 68/02; H04W 52/0209; H04W 52/02; H04W 4/008; H04W 4/00
See application file for complete search history.

(56) References Cited

U.S. PATENT DOCUMENTS

| | | |
|---|---|---|
| 2010/0227632 A1 | 9/2010 | Bell et al. |
| 2011/0296514 A1* | 12/2011 | Koennecke ............. G06F 21/34 726/9 |
| 2013/0346494 A1 | 12/2013 | Nakfour et al. |
| 2014/0053078 A1 | 2/2014 | Kannan |
| 2014/0129652 A1 | 5/2014 | Chan et al. |
| 2014/0297763 A1* | 10/2014 | Wan ........................ H04L 51/18 709/206 |
| 2014/0365569 A1 | 12/2014 | Vyrros et al. |

FOREIGN PATENT DOCUMENTS

| | | |
|---|---|---|
| WO | 2015183829 A1 | 12/2015 |
| WO | 2016184531 A1 | 11/2016 |

OTHER PUBLICATIONS

Combined Search and Examination Report from counterpart United Kingdom Application No. GB1621982.6, dated May 23, 2017, 5 pp.
Response to Examination Report dated May 18, 2017, from counterpart Great Britain Application No. 1621982.6, filed May 23, 2018, 14 pages.

* cited by examiner

OFFLINE PEER-ASSISTED NOTIFICATION DELIVERY

This application claims the benefit of U.S. Provisional Application No. 62/337,700 filed May 17, 2016, which is incorporated herein by reference in its entirety.

BACKGROUND

Generally, mobile devices utilize cellular networks or wireless local area networks (e.g., WI-FI®) to receive notifications from central servers. Mobile devices may only receive these notifications when there is a sufficient signal strength level from the respective cellular network or wireless local area network, at the mobile device's location, when the server device is attempting to send the notification. Due to the nature of privatized cellular networks, different cellular networks have varied signal strengths in different areas, including dead zones where a particular cellular network may have no coverage. Weak-network connection strength situations prevent the mobile devices connected to these cellular networks from being able to successfully receive notifications.

SUMMARY

In one example, a method includes receiving, by a server device, notification data for a notification account that is associated with a computing device. The method may further include determining, by the server device, that the computing device is currently offline. The method may further include responsive to determining that the computing device is currently offline, identifying, by the server device, a group of one or more sharing devices and sending, by the server device, a notification package to a sharing device of the group of one or more sharing devices, wherein the notification package includes the notification data, an account identifier associated with the notification account, and a device identifier associated with the computing device.

In another example, a method includes receiving, by a first computing device and from a server, a request to forward notification data to a second computing device, wherein the request includes the notification data and a device identifier. The method may further include receiving, by the first computing device, the notification data from the server device. The method may further include, responsive to determining, by the first computing device, that a device identifier associated with the second computing device matches the device identifier included in the request, forwarding, by the first computing device, the notification data to the second computing device.

In another example, a system includes a sharing device of a group of one or more sharing devices and a server device. The server device may be configured to receive notification data for a notification account that is associated with a computing device. The server device may be further configured to determine that the computing device is currently offline. The server device may be further configured to, responsive to determining that the computing device is currently offline, identify a group of one or more sharing devices and send a notification package to the sharing device, wherein the notification package includes the notification data, an account identifier associated with the notification account, and a device identifier associated with the computing device. The sharing device may be configured to receive the notification package from the server device and, responsive to determining, by the sharing device, that a device identifier associated with the computing device matches the device identifier included in the notification package, forward the notification data to the second computing device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
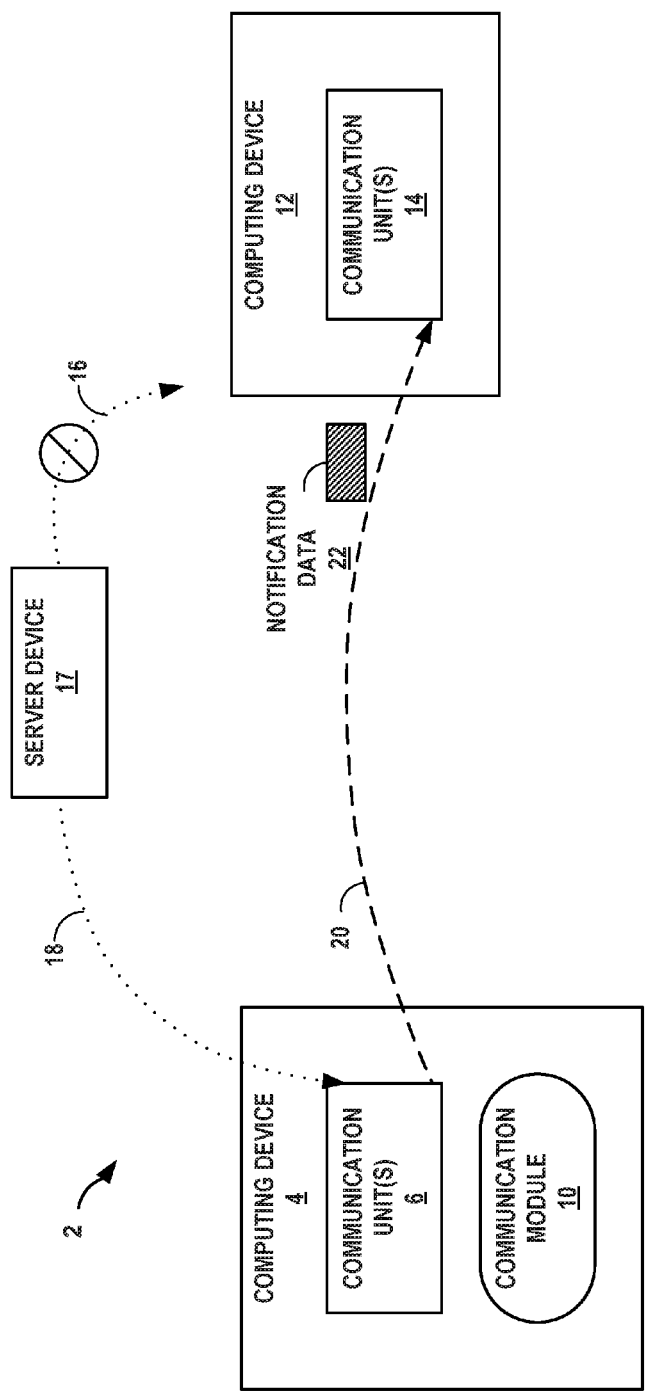
FIG. 1 is a conceptual diagram illustrating an example server device configured to send notification data to a computing device via an intermediate sharing device, in accordance with one or more aspects of the present disclosure.

In general, this disclosure is directed to techniques for sending notification data to computing devices that is currently unable to communicate with a central server and, therefore, unable to receive the notification data from the central server. A server device may receive notification data for a notification account that is associated with a computing device, such as a computing device (e.g., a mobile telephone), and determine that the computing device is not currently connected to the network over which the server device is attempting to send the notification data. In other words, the computing device may be in an area of weak or no wireless (e.g., cellular) service or no Internet service and may therefore be unable to receive the incoming communication from the server device. The server device may then identify a group of one or more sharing devices (e.g., other mobile phones or computing devices that do have a wireless or Internet connection) and send a notification package to one of the sharing devices within that group. The notification package includes the notification data, an account identifier associated with the notification account, and a device identifier associated with the computing device. The sharing device may receive the notification package from the server device and, responsive to determining that a device identifier for the computing device matches the device identifier in the notification package, forward the notification data to the computing device.

In many developing markets, a large number of devices may spend long periods of time not connected to the Internet or a cellular network due to the sparseness of available connections or the expense involved in connecting to these services. However, the users of these devices may wish to connect to these services if the users know that they have notifications that need addressing. Rather than storing some or all of the notifications for a particular computing device on the central server, techniques of this disclosure enable a server to send the notification data to an intermediate sharing device that may be able to communicate with (e.g., come within a communication range of) the ultimate recipient of the notification data. Once the intermediate sharing device is able to communicate with the ultimate recipient, the intermediate sharing device may forward the notification data (e.g., using a non-Internet protocol), potentially reducing the need for the ultimate recipient to connect to the Internet or wireless network. By sending the notification data to the intermediate sharing device, the server device reduces the amount of network traffic and data consumption utilized once the recipient device finally is able to connect to the server device, which may also reduce battery consumption at the recipient device. The techniques described herein may further reduce the chance of the recipient device not receiving a notification, or receiving the notification in an untimely manner, due to the connection issues.

FIG. 1 is a conceptual diagram illustrating an example server device 17 configured to send notification data 22 to a computing device 12 via an intermediate sharing device 4, in accordance with one or more aspects of the present disclosure. As further described below, based at least in part on computing device 12 being unable to communicate with server device 17, server device 17 may send notification data 22 for computing device 12 first to sharing device 4, which forwards the notification data to the computing device.

As shown in FIG. 1, system 2 includes computing device 4 and computing device 12. In the example of FIG. 1, computing device 4 and computing device 12 are described as mobile telephones. However, in some examples, computing device 4 and computing device 12 may be computerized watches (e.g., a smartwatches), computerized eyewear, computerized headwear, other types of wearable computing devices, tablet computers, personal digital assistants (PDAs), laptop computers, gaming systems, media players, e-book readers, television platforms, automobile navigation systems, digital cameras, home appliances, or any other type of mobile and/or non-mobile computing devices that are configured to send data packets to other computing devices. A respective display component may be integral to or remote from computing device 4 and computing device 12.

Computing device 4 includes one or more communication units 6 (hereinafter, "communication unit 6") and communication module 10. Communication module 10 may perform operations described herein using software, hardware, firmware, or a mixture of hardware, software, and/or firmware residing in and/or executing at computing device 4. Computing device 4 may execute communication module 10 with one or more processors. In some examples, computing device 4 may execute communication module 10 as one or more virtual machines executing on underlying hardware of computing device 4. Communication module 10 may execute as one or more services or components of operating systems or computing platforms of computing device 4. Communication module 10 may execute as one or more executable programs at application layers of computing platforms of computing device 4 with operating system privileges or with access to a runtime library of computing device 4. In some examples, communication unit 6, and/or communication module 10 may be arranged remotely to and be remotely accessible to computing device 4, for instance, via interaction by computing device 4 with one or more remote network devices.

Computing device 4 also includes one or more communication units 6. Computing device 4, in one example, utilizes communication unit 6 to communicate with external devices via one or more networks, such as one or more wired or wireless networks. Communication unit 6 may be a network interface card, such as an Ethernet card, an optical transceiver, a radio frequency transceiver, or any other type of device that can send and receive information. Examples of such network interfaces may include BLUETOOTH®, infrared signaling, 3G, long-term evolution (LTE), near field communication, and WI-FI® radios as well as Universal Serial Bus (USB) and Ethernet. In some examples, computing device 4 utilizes communication unit 6 to wirelessly communicate with another computing device that is operably coupled to computing device 4. Computing device 12 also includes one or more communication units 14, which may be similar to communication unit 6 of computing device 4.

Server 17 may be a computer program or a machine capable of accepting requests from clients, such as computing device 4, and responding to them. Server 17 may be any of database servers, file servers, mail servers, print servers, web servers, game servers, and application servers, among other types of servers. Server 17 may consist of a single computing device or a cluster of two or more computing devices working in tandem. Server 17 may be a cloud-based server. Server 17 may perform network management server functions which perform administrative tasks. Server 17 may also be a hub device for a cellular network or an Internet service. In such examples, server 17 may receive data to be sent to particular computing devices using the cellular service or the Internet service. Server 17 may coordinate the distribution of this data over the cellular network or the Internet service. Server 17 may also receive communication initiations or communication responses from other computing devices that are connected to the particular cellular network or Internet service.

In accordance with techniques of this disclosure, server 17 may receive notification data for a notification account that is associated with computing device 12. For instance, the notification data may be an update from a social networking application. In such an example, server 17 may receive the notification data from a device associated with the social networking application, such as a server that hosts the social networking application. Server 17 may also receive information regarding the notification account for which the notification data is intended for. Server 17 may store a database that associated the notification account with a specific computing device such that, upon receiving the notification data, server 17 may perform a lookup in the database to determine which computing device should receive the notification data.

Server 17 may determine that computing device 12 is currently offline. For instance, upon receiving the notification data from the local server that hosts the social networking application, server 17 may attempt to send the notification data to computing device 12 via one or more signals 16. However, computing device 12 may be currently unable to receive the notification data from server 17. For example, computing device 12 may be in a mode that blocks incoming signals from a cellular network or an Internet service, such as the commonly referenced "Airplane Mode". In other examples, computing device 12 may be geographically located in an area without cellular service or an Internet connection. In any case, server 17 may determine that computing device 12 is currently unable to receive and process one or more signals 16 in order to obtain the notification data.

Responsive to determining that computing device 12 is currently offline, server 17 may identify a group of one or more sharing devices. Server 17 may select one of the sharing devices (e.g., computing device 4) that is able to communicate with server 17 and send a notification package to the selected sharing device. The notification package may include the original notification data received by server 17, an account identifier associated with the notification account, and a device identifier associated with computing device 12. In the example of FIG. 1, upon determining that computing device 12 is currently offline, rather than waiting for computing device 12 to regain access to the cellular or Internet network, server 17 may instead send a notification package via one or more signals 18 to computing device 4 that includes the notification data. At this point, computing device 4 may then be tasked with delivering the notification data to computing device 12.

Computing device 4 may receive a request to forward the notification data to computing device 12 from server 17. The request may include the notification data and a device identifier that identifies computing device 12. As described above, server 17 may select computing device 4 as a sharing device from a group of determined sharing devices. Once server 17 selects computing device 4, computing device 4 may receive the request via one or more signals 18 to forward the notification data to computing device 12.

Computing device 4 and computing device 12 may have exchanged data or connected via some form of non-Internet protocol at some point in the past. As such, computing device 4 may detect when computing device 4 is able to connect via the non-Internet protocol with computing device 12. Once computing device 4 and computing device 12 are in communication with one another, computing device 4 may compare a device identifier associated with computing device 12 with the device identifier included in the request sent via one or more signals 18 in order to determine whether the device identifiers match. This ensures that computing device 4 is sending the notification data to the correct recipient, as there may be examples where server 17 utilizes computing device 4 to forward notification data to numerous recipient computing devices.

Responsive to determining that the device identifier associated with computing device 12 matches the device identifier included in the request from server 17, computing device 4 may forward the notification data (e.g., notification data 22) to computing device 12 via one or more signals 20. For instance, when computing device 4 and computing device 12 are able to connect via the non-Internet protocol, computing device 4 may determine, using the device identifiers, whether computing device 12 is the intended recipient of the notification data received from server 17. Even though the original notification data that server 17 receives may include notification account information, computing device 4 may disregard the notification account information when forwarding the notification data to computing device 12. Since a single computing device may be associated with multiple different accounts, even within the same application or service (e.g., computing device 12 may be associated with multiple accounts in the social networking application from which the notification data originates), the account information may be inconsequential to the delivery of the notification data itself. In order to efficiently deliver the notification data, computing device 4 may simply forward the notification data to computing device 12 upon the affirmative comparison of the device identifiers.

Rather than storing all of the notifications for computing device 12 on server 17, techniques of this disclosure enable server 17 to send the notification data to an intermediate sharing device (e.g., computing device 4) that may come within a communication range of computing device 12. Once the intermediate sharing device does come within a communication range of computing device 12, the intermediate sharing device may forward the notification data using a non-Internet protocol, reducing the need for computing device 12 to connect to the Internet or cellular network. By sending the notification data to the intermediate sharing device, server 17 reduces the amount of network traffic and data consumption utilized once computing device 12 is finally able to connect to server 17, which may also reduce battery consumption at computing device 12. The techniques described herein may further reduce the chance of computing device 12 not receiving a notification, or receiving the notification in an untimely manner, due to the connection issues.

Figure 2:
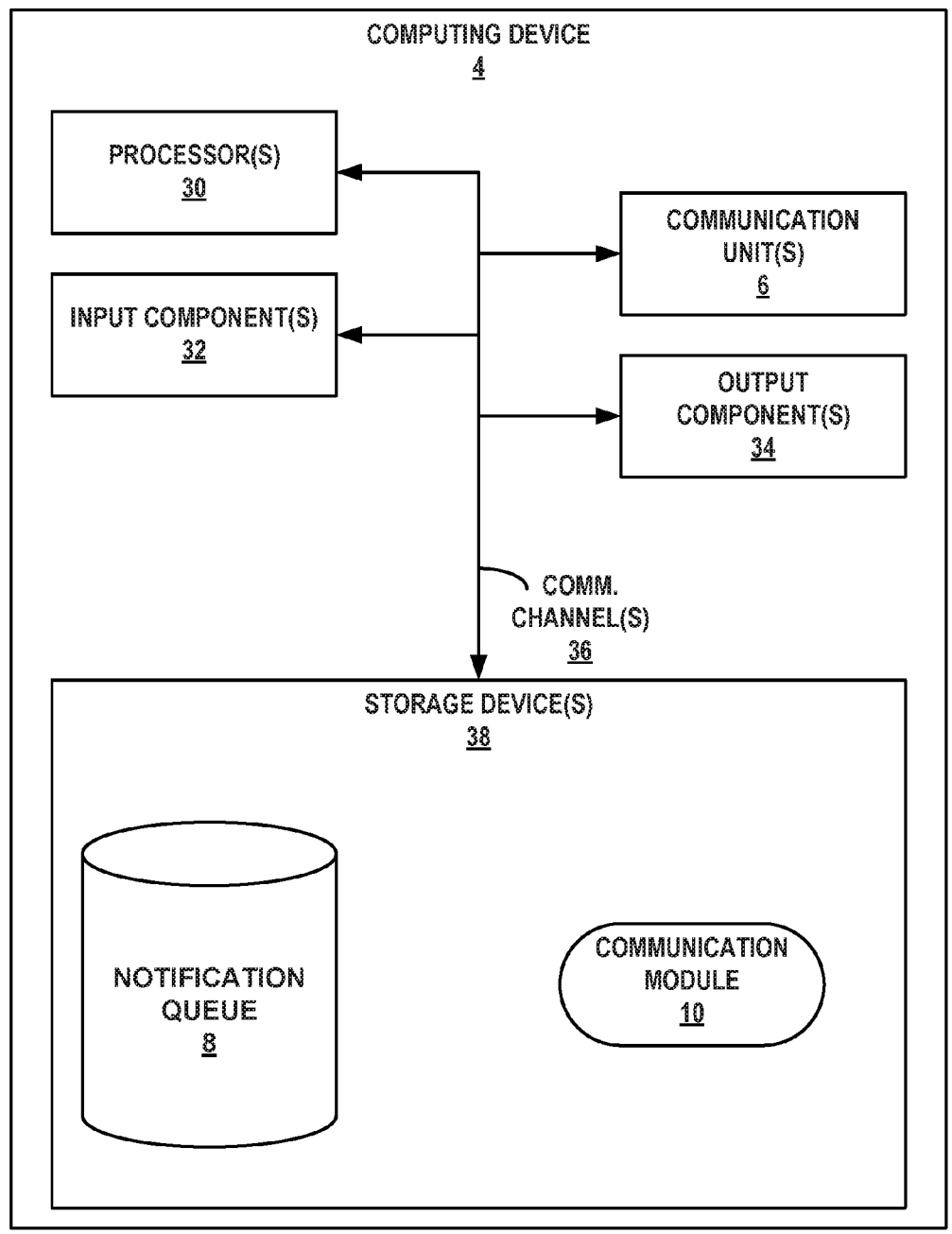
FIG. 2 is a block diagram illustrating further details of the example sharing device of FIG. 1, in accordance with one or more aspects of the present disclosure.

FIG. 2 is a block diagram illustrating further details of the example sharing device of FIG. 1 (e.g., computing device 4), in accordance with one or more aspects of the present disclosure. FIG. 2 illustrates only one particular example of computing device 4, and many other examples of computing device 4 may be used in other instances.

As shown in the specific example of FIG. 2, computing device 4 includes one or more processors 30, one or more input components 32, one or more communication units 6, one or more output components 34, and one or more storage devices 38. Storage devices 38 of computing device 4, in the example of FIG. 2, include communication module 10 and notification queue 8. Each of components 6, 8, 10, 30, 32, 34, and 38 may be interconnected (physically, communicatively, and/or operatively) for inter-component communications. In some examples, communication channels 36 may include a system bus, network connection, inter-process communication data structure, or any other channel for communicating data. As one example in FIG. 2, components 6, 8, 10, 30, 32, 34, and 38 may be coupled by one or more communication channels 36. Communication module 10 and notification queue 8 may also communicate information with one another as well as with other components in computing device 4.

Processors 30, in one example, are configured to implement functionality and/or process instructions for execution within computing device 4. For example, processors 30 may be capable of processing instructions stored in storage devices 38. Examples of processors 30 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 38 may be configured to store information within computing device 4 during operation. Storage devices 38, in some examples, are described as one or more computer-readable storage media. In some examples, storage devices 38 are temporary memory, meaning that a primary purpose of storage devices 38 is not long-term storage. Storage devices 38, in some examples, are described as a volatile memory, meaning that storage devices 38 do not maintain stored contents when the computing device is turned off. Examples of volatile memories include random access memories (RAM), dynamic random access memories (DRAM), static random access memories (SRAM), and other forms of volatile memories known in the art. In some examples, storage devices 38 are used to store program instructions for execution by processors 30. Storage devices 38, in one example, is used by software or applications running on computing device 4 (e.g., application 8) to temporarily store information during program execution.

Storage devices 38, in some examples, also include one or more computer-readable storage media. Storage devices 38 may be configured to store larger amounts of information than volatile memory. Storage devices 38 may further be configured for long-term storage of information. In some examples, storage devices 38 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 4, in one example, also includes one or more input components 32. Input components 32, in some examples, is configured to receive input from a user through tactile, audio, or video feedback. Examples of input components 32 include a display component, a mouse, a keyboard, a camera, a microphone or any other type of device for detecting input from a user. In some examples, a display component includes a touch-sensitive screen.

One or more output components 34 may also be included in computing device 4. Output components 34, in some examples, is configured to provide output to a user using tactile, audio, or video stimuli. Output components 34, in one example, includes an electronic display, a loudspeaker, or any other type of device for converting a signal into an appropriate form understandable to humans or machines. The electronic display may be an LCD or OLED part of a touch screen, may be a non-touchscreen direct view display component such as a CRT, LED, LCD, or OLED. The display component may also be a projector instead of a direct view display.

In some examples, computing device 4 may further include components not pictured, such as a display component. The display component may be configured to output graphical content on the display and receive indications of user input via a presence-sensitive input component. In some examples, the presence-sensitive input component may detect an object at and/or near the screen of the display component. As one example range, the presence-sensitive input component may detect an object, such as a finger or stylus that is within 2 inches (~5.08 centimeters) or less of the physical screen of the display component. The presence-sensitive input component may determine a location (e.g., an (x,y) coordinate) of the display component at which the object was detected. In another example range, the presence-sensitive input component may detect an object 6 inches (~15.24 centimeters) or less from the physical screen of the display component and other exemplary ranges are also possible. The presence-sensitive input component may determine the location of the display selected by a user's finger using capacitive, inductive, and/or optical recognition techniques. In some examples, the presence-sensitive input component provides output to a user using tactile, audio, or video stimuli.

In accordance with techniques of this disclosure, communication module 10 may receive, via communication unit 6, a request to forward notification data to a second computing device from a server device. The request may include the notification data itself and a device identifier. For instance, communication module 10 may receive, via communication unit 6, notification data pertaining to a news alert from a news application for the second computing device. If the server device is not currently able to communicate with the second computing device for the purpose of sending the notification data directly to the second computing device, communication module 6 may instead receive the notification data on behalf of the second computing device. Communication module 10 may also receive a device identifier that indicates the computing device that is the intended recipient of the notification date (e.g., the second computing device). Upon receiving the request, communication module 10 may store the notification data and the device identifier in notification queue 8 until communication module 10 is able to forward the notification data to the second computing device.

Computing device 4 and the second computing device that is the intended recipient of the notification data may have exchanged data packets at some point in the past. For instance, prior to receiving the request, communication module 10 may connect to the second computing device via some form of non-Internet protocol and send data to the second computing device via the non-Internet protocol. This data may be a text message, video data, image data, or any other communication that indicates that computing device 4 and the second computing device may have been in the general vicinity of one another at some point and may again be in communication range of one another at some point in the future. During this data exchange, communication module 10 may receive a first token from the second computing device. The first token may include the device identifier for the second computing device and an account identifier for a notification account associated with the second computing device. Communication module 10 may then send identifier information to the server device. The identifier information may include the first token and a second token that includes a device identifier for computing device 4. In some examples, communication module 10 may combine the two tokens into a single token to form the identifier information. In other examples, communication module 10 may send the two tokens to the server device as separate data objects. The server device may use this identifier information to track that server device may send notification data for either computing device 4 or the second computing device to the other computing device and reasonably expect that the notification data will be delivered.

Communication module 10 may detect when communication unit 6 of computing device 4 is able to connect, such as via the non-Internet protocol, with the second computing device. Once computing device 4 and the second computing device are in communication with one another, communication module 10 may compare a device identifier associated with the second computing device with the device identifier included in the request received from the server device in order to determine whether the device identifiers match. This ensures that computing device 4 is sending the notification data to the correct recipient, as there may be examples where the server device utilizes computing device 4 to forward notification data to numerous recipient computing devices and communication module 10 stores numerous instances of notification data and device identifiers in notification queue 8. For instance, notification queue 8 may hold a news alert for the second computing device, a social networking update for a third computing device, and a video notification for a fourth computing device simultaneously.

Responsive to determining that the device identifier associated with the second computing device matches the device identifier included in the request from the server device, communication module 10 may forward the notification data to the second computing device. For instance, communication module 10 may use communication unit 6 to determine whether the second computing device is within a communication range of computing device 4 for a communication protocol, such as a non-Internet protocol. When computing device 4 and the second computing device connect (e.g., the two devices are within the communication range for the non-Internet protocol and connect, either automatically or manually), communication module 10 may determine, using the device identifiers stored in notification queue 8, whether the second computing device is the intended recipient of the notification data received from the server device. Communication module 10 may send the notification data to the second computing device using the non-Internet protocol using communication unit 6. In some examples, the non-Internet protocol may be a Bluetooth® protocol or a near field communication protocol.

Even though the original notification data that the server device receives may include notification account information, communication module 10 may disregard the notification account information when forwarding the notification data to the second computing device. Since a single computing device may be associated with multiple different accounts, even within the same application or service (e.g., the second computing device may be associated with multiple subscriber accounts in the news application from which the notification data originates), the account information may be inconsequential to the delivery of the notification data itself. In order to efficiently deliver the notification data, communication module 10 may simply forward the notification data using communication unit 6 to the second computing device upon the affirmative comparison of the device identifiers.

In some examples, communication module 10 may record a timestamp associated with the notification data in notification queue 8. The timestamp may indicate a time when the notification data was received from the server device. In such examples, communication module 10 may send the timestamp to the second computing device with the notification data. The timestamp assists the second computing device in determining whether the notification data is still pertinent. For example, computing device 4 may be unaware of whether the second computing device has received notification data from the central server in the time since communication module 10 received the notification data. In such examples, when the second computing device receives the notification data from the first computing device, the second computing device may compare the timestamp of the notification data with an internally tracked time of the last instance of the second computing device connecting to the server device. If the timestamp of the notification data is more recent than the internally tracked time, then the second computing device may determine that the notification data is pertinent. If the timestamp is less recent than the internally tracked time, then the second computing device may disregard the received notification data.

In some examples, after sending the notification data to the second computing device, communication module 10 may receive an indication that the second computing device has received the notification data from communication module 10, such as a confirmation message. In such examples, communication module 10 may forward the indication to the server device. This enables the server device to be aware that communication module 10 completed the process of sending the notification data to the intended recipient.

In some examples, when forwarding the notification data to the second computing device, communication module 10 may forward the notification data to an intermediate computing device, which in turn forwards the notification data to the second computing device. In the example of FIG. 2, computing device 4 may be local host device in an office complex that is connected to the server device via an Internet connection. The user of the second computing device may be a spouse of a person who works at the office complex that houses computing device 4. In such examples, the server device may determine that the most optimal route of efficiently delivering the notification data to the second computing device during a business day is to send the notification data to the local host device in the office complex. The local host device in the office complex may then forward the notification data to a computing device used by the person who works at the office complex that houses the local host device (e.g., computing device 4). When the person who works at the office complex that houses the local host device returns home with their intermediate computing device, the intermediate computing device may forward the notification data to the intended recipient, or the second computing device used by the employee's spouse.

In some further examples, communication module 10 may receive, with the notification data, an expiration date for the notification data from the server device. The expiration date may indicate a time at which the communication module 10 will delete the notification data from notification queue 8 if the communication module 10 has not yet delivered the notification data to the second computing device. In such examples, responsive to determining that the expiration date has passed and that communication module 10 has not yet delivered the notification data to the second computing device, communication module 10 may proceed to delete the notification data from notification queue 8. By including an expiration date, computing device 4 is not burdened with storing the notification data for an indefinite amount of time. The expiration date may be an amount of time which it can be reasonably expected that the second computing device will, at some point, connect to the server device. For instance, the expiration date may be a day, three days, a week, or any other reasonably determined amount of time.

Figure 3:
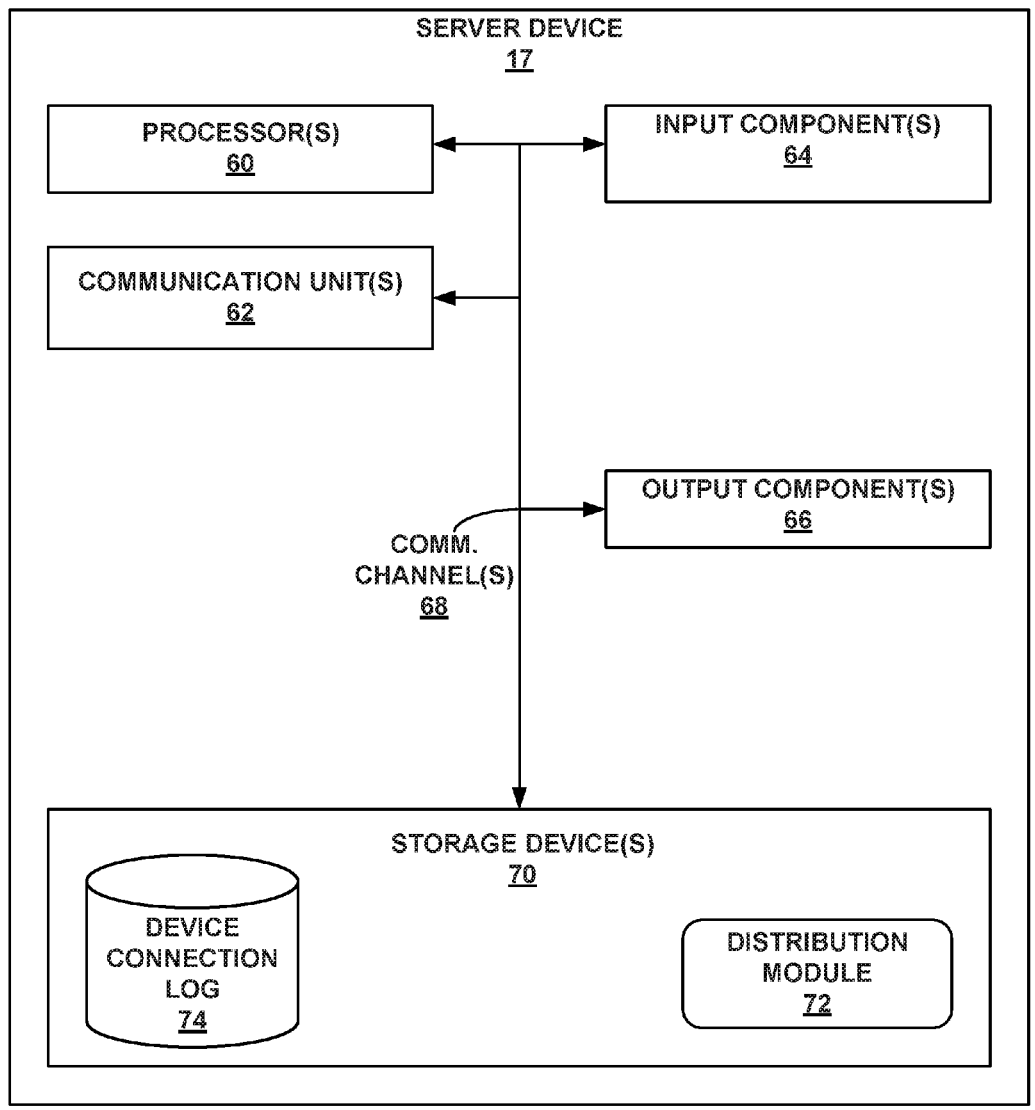
FIG. 3 is a block diagram illustrating further details of the example server device, in accordance with one or more techniques of this disclosure.

FIG. 3 is a block diagram illustrating further details of the example server device, in accordance with one or more techniques of this disclosure. Server 17 of FIG. 3 in some examples represents an example of server 17 of FIG. 1. FIG. 3 illustrates only one particular example of server 17, and many other examples of server 17 may be used in other instances and may include a subset of the components included in example server 17 or may include additional components not shown in FIG. 3.

Server 17 may include additional components that, for clarity, are not shown in FIG. 3. For example, server 17 may include a battery to provide power to the components of server 17. Similarly, the components of server 17 shown in FIG. 3 may not be necessary in every example of server 17. For example, in some configurations, server 17 may not include input components 64.

As shown in the example of FIG. 3, server 17 includes one or more processors 60, one or more input components 64, one or more communication units 62, one or more output components 66, and one or more storage devices 70. Storage devices 70 may include distribution module 72 and device connection log 74.

Output components 66, in some examples, is configured to provide output to a user using tactile, audio, or video stimuli. Output components 66, in one example, includes an electronic display, a loudspeaker, or any other type of device for converting a signal into an appropriate form understandable to humans or machines. The electronic display may be an LCD or OLED part of a touch screen, may be a non-touchscreen direct view display component such as a CRT, LED, LCD, or OLED. The display component may also be a projector instead of a direct view display.

Input components 64, in some examples, is configured to receive input from a user through tactile, audio, or video feedback. Examples of input component 64 include a display component, a mouse, a keyboard, a camera, a microphone or any other type of device for detecting input from a user. In some examples, a display component includes a touch-sensitive screen.

One or more storage devices 70 of server 17 include device connection log 74 and distribution module 72. One or more storage devices 70 may be configured to store information within server 17 during operation. Storage devices 70, in some examples, are described as computer-readable storage media. In some examples, storage devices 70 are temporary memory, meaning that a primary purpose of storage devices 70 is not long-term storage. Storage devices 70, in some examples, are described as a volatile memory, meaning that storage devices 70 do not maintain stored contents when the computing device is turned off. Examples of volatile memories include random access memories (RAM), dynamic random access memories (DRAM), static random access memories (SRAM), and other forms of volatile memories known in the art. In some examples, storage devices 70 is used to store program instructions for execution by processors 60. For instance, device connection log 74 may be configured for short-term storage and temporarily hold notification data for mobile computing devices that connect intermittently to server 17.

Storage devices 70, in some examples, also include one or more computer-readable storage media. Storage devices 70 may be configured to store larger amounts of information than volatile memory. Storage devices 70 may further be configured for long-term storage of information. In some examples, storage devices 70 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Communication channels 68 may interconnect each of the components 60, 62, 64, 66, 70, 74, and 72 for inter-component communications (physically, communicatively, and/or operatively). In some examples, communication channels 68 may include a system bus, a network connection, an inter-process communication data structure, or any other method for communicating data.

One or more communication units 62 of server 17 may communicate with external devices, such as a server device, via one or more wired and/or wireless networks by transmitting and/or receiving network signals on the one or more networks. Communication unit 62 may be a network interface card, such as an Ethernet card, an optical transceiver, a radio frequency transceiver, or any other type of device that can send and receive information. Examples of such network interfaces may include Bluetooth, infrared signaling, 3G, LTE, near field communication, and Wi-Fi radios as well as Universal Serial Bus (USB) and Ethernet. In some examples, server 17 utilizes communication unit 62 to wirelessly communicate with another computing device that is operably coupled to server 17, such as a mobile computing device.

One or more processors 60, in one example, are configured to implement functionality and/or process instructions for execution within server 17. For example, processors 60 may be capable of processing instructions stored in storage device 70. Examples of processors 60 may include, any one or more of a microprocessor, a controller, a digital signal processor (DSP), an application specific integrated circuit (ASIC), a field-programmable gate array (FPGA), or equivalent discrete or integrated logic circuitry.

In accordance with techniques of this disclosure, distribution module 72 of server 17 may receive notification data for a notification account that is associated with a computing device. For instance, the notification data may be an update from a gaming application. In such an example, distribution module 72 may receive the notification data from a device associated with the gaming application, such as a server that hosts the gaming application. Distribution module 72 may also receive information regarding the notification account for which the notification data is intended for. Distribution module 72 may store a database (e.g., device connection log 74) that associated the notification account with a specific computing device such that, upon receiving the notification data, distribution module 72 may perform a lookup in device connection log 74 to determine which computing device should receive the notification data.

Distribution module 72 may determine that the computing device is currently offline. For instance, upon receiving the notification data from the local server that hosts the gaming application, distribution module 72 may attempt to send the notification data to the computing device using a wireless (e.g., cellular) connection or an Internet connection. However, the computing device may be currently unable to receive the notification data from server 17. For example, the computing device may be in a mode that blocks incoming signals from a cellular network or an Internet service, such as the commonly referenced "Airplane Mode". In other examples, the computing device may be geographically located in an area without cellular service or an Internet connection. In any case, distribution module 72 may determine that the computing device is currently unable to receive and process a signal from communication unit 62 in order to obtain the notification data if distribution module 72 does not receive an interaction event from the computing device within a predetermined response time threshold. The interaction event may be any type of confirmation from the computing device that indicates that the computing device received the notification data.

Responsive to determining that the computing device is currently offline, distribution module 72 may identify a group of one or more sharing devices using device connection log 74. Distribution module 72 may select one of the sharing devices that are currently able to communicate with server 17 and send a notification package to the selected sharing device. The notification package may include the original notification data received by distribution module 72, an account identifier associated with the notification account, and a device identifier associated with the computing device. In the example of FIG. 3, upon determining that the computing device is currently offline, rather than waiting for the computing device to regain access to the cellular or Internet network, distribution module 72 may instead send a notification package that includes the notification data to the sharing device identified from device connection log 74.

In selecting the sharing device, distribution module 72 may prune the group of one or more sharing devices based on various pieces of information so as to not overburden any particular sharing device or so as to most efficiently deliver the notification data to the computing device. For instance, distribution module 72 may prune the group of one or more sharing devices based at least in part on a number of notifications in a queue on server 17, a timestamp for each respective sharing device of the group of one or more sharing devices indicating when the respective sharing device last communicated with server 17, a number of notifications in a respective queue for each respective sharing device of the group of one or more sharing devices, or a number of instances within a predetermined amount of time that each respective sharing device of the group of one or more sharing devices sent notification data to the computing device. Distribution module 72 may prune sharing devices that have not recently been in communication with server 17, sharing devices with a large number of instances of notification data that must be delivered, or sharing devices that have not recently sent notification data to the intended recipient.

The group of one or more sharing devices may be a list stored in device connection log 74. Distribution module 72 may construct this list based on various identified sharing devices. For instance, distribution module 72 may receive a token from a sharing device. In some examples, the token may include comprises the device identifier associated with the computing device, the account identifier for the notification account associated with the computing device, and a device identifier for the sharing device. In other instances, the token may be a first token that only includes a device identifier for the sharing device. In such instances, distribution module 72 may further receive a second token from the sharing device that includes a device identifier for the computing device and an account identifier for the notification account associated with the computing device. Distribution module 72 may then concatenate the first token and the second token to produce a third token that includes each of the device identifier for the sharing device, the device identifier for the computing device, and the account identifier for the notification account associated with the computing device. In any case, distribution module 72 may extract the information from the received tokens and store the information in device connection log 74. Distribution module 72 may then select the sharing device from device connection log 74, where device connection log 74 lists all sharing devices that have previously exchanged data with the computing device.

At this point, in some instances, the sharing device may then be tasked with delivering the notification data to the computing device. In other instances, distribution module 72 may still attempt to send the notification data to the computing device. In such instances, distribution module 72 may implement a race condition on the notification data. Specifically, distribution module 72 may continue attempting to send the notification data to the computing device until either distribution module 72 successfully sends the notification data to the computing device or distribution module 72 receives an indication from the sharing device that the computing device has successfully received the notification data from the sharing device. Once either of these conditions occurs, distribution module 72 may cease attempting to send the notification data to the intended recipient device.

In some examples, distribution module 72 may additionally send an expiration date for the notification data to the sharing device. The expiration date may indicate a time at which the sharing device will delete the notification data from an internal notification queue if the sharing device has not yet delivered the notification data to the computing device. In such examples, if the expiration date has passed and the sharing device has not yet delivered the notification data to the second computing device, the sharing device may proceed to delete the notification data from the internal notification queue. By including an expiration date, the sharing device is not burdened with storing the notification data for an indefinite amount of time. The expiration date may be an amount of time which it can be reasonably expected that the second computing device will, at some point, connect to the server device. For instance, the expiration date may be a day, three days, a week, or any other reasonably determined amount of time.

Figure 4:
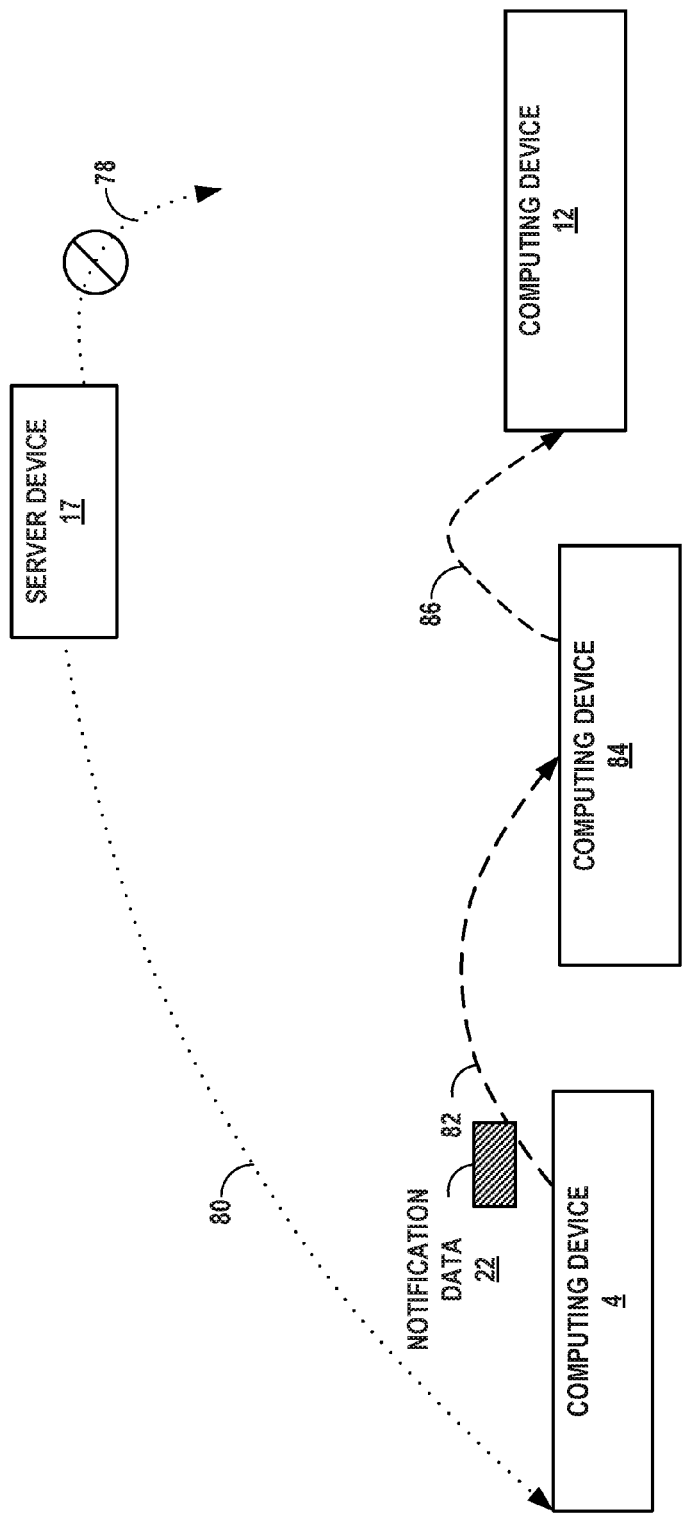
FIG. 4 is a conceptual diagram illustrating an example server device configured to send notification data to a computing device via multiple intermediate sharing devices, in accordance with one or more aspects of the present disclosure.

FIG. 4 is a conceptual diagram illustrating an example server device configured to send notification data to a computing device via multiple intermediate sharing devices, in accordance with one or more aspects of the present disclosure. In the example of FIG. 4, computing device 4 may be a computing device similar to computing device 4 as described with respect to FIGS. 1 and/or 2. Further, server 17 may be a server device similar to server 17 as described with respect to FIGS. 1 and/or 3.

In the example of FIG. 4, server 17 may attempt to send notification data 22, which may, in some non-limiting examples, be a video notification from a video streaming application, to computing device 12 via one or more signals 78, similarly to FIG. 1. When one or more signals 78 fails to reach computing device 12, server 17 may determine an alternate method for delivering notification data 22 to computing device 12. In the example of FIG. 4, rather than using a single sharing device (e.g., computing device 4), server 17 may utilize a chain of sharing devices in order to deliver notification data 22 to computing device 12.

In the non-limiting yet illustrative example of FIG. 4, computing device 4 may be a stationary computing device in a home that is connected to server 17 via an Internet connection, such as a smart television. The user of the computing device 12 may be a friend of the owner of computing device 4. Further, the owner of computing device 4 may also own computing device 84, which may be a wearable computing device, such as a smartwatch.

In such examples, server 17 may determine that the most optimal route of efficiently delivering the video notification to computing device 12 is to first send the notification data to computing device 4. As such, server 17 may send a notification package that includes notification data 22 to computing device 4 via one or more signals 80. The notification package may also include an account identifier associated with the notification account of the video application and a device identifier associated with computing device 12. In the example of FIG. 4, however, the notification package may include a device identifier associated with computing device 84. This additional device identifier may either indicate that computing device 4 may transfer the notification data to either computing device 84 or computing device 12, or that computing device 4 has explicit instructions to forward the notification data to computing device 84.

In the example of FIG. 4, the mutual owner of computing device 4 and computing device 84 may come within communication range of one another. As such, computing device 4 and computing device 84 may connect, such as via a non-Internet protocol such as Bluetooth® or near-field communication, and transfer notification data 22 via one or more signals 82. In some examples, computing device 4 may delete any remnants of notification data 22 from a memory of computing device 4 upon the transfer. In other examples, computing device 4 may continue to store a copy of notification data 22 in preparation of a scenario where computing device 4 may come within communication range of computing device 12 prior to computing device 84 coming within communication range of computing device 12.

In the example of FIG. 4, computing device 84 may come within communication range of computing device 12, such as if the owner of computing device 84 and the owner of computing device 12 met in a restaurant. In general, in accordance with techniques of this disclosure, a communication range may be a certain zone or range at which short-range communication signals (e.g., Bluetooth®, near-field communication, or other non-Internet protocols) are detected with a sufficient enough strength that two devices may connect to one another using the short-range communication protocols. Upon computing device 84 and computing device 12 coming within communication range of one another, computing device 84 and computing device 12 may connect, such as via a non-Internet protocol such as Bluetooth® or near field communication, and computing device 84 may send notification data 22 to computing device 12 via one or more signals 86. Upon the receipt of notification data 22 by computing device 12, any of computing devices 4, 84, or 12 may send a confirmation indication to server 17 to indicate that notification data 22 was successfully delivered to computing device 12.

Figure 5:
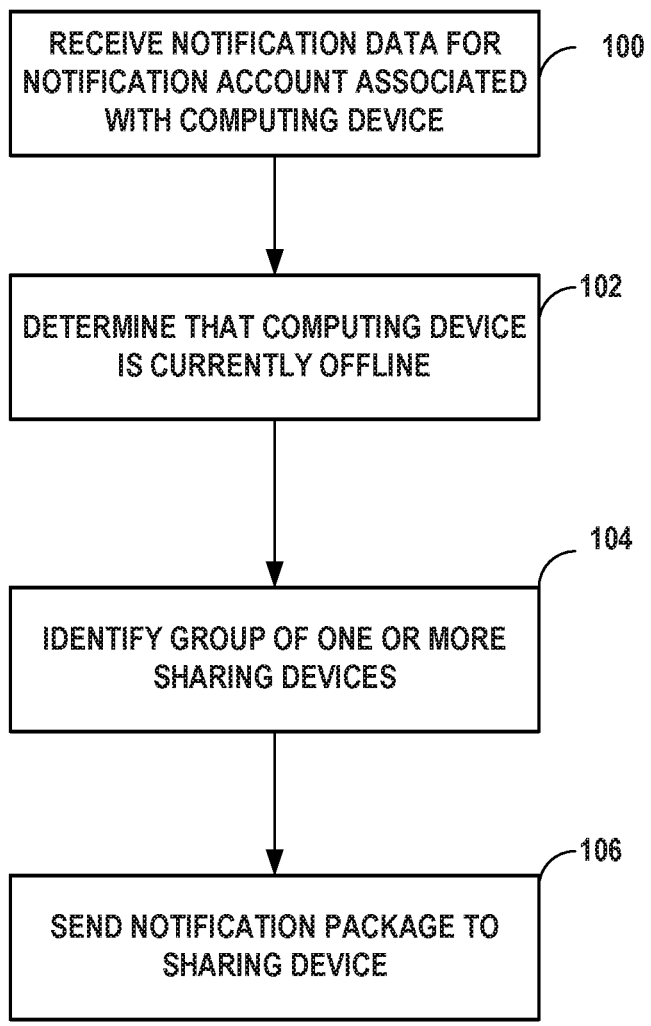
FIG. 5 is a flow diagram illustrating example operations of a server device that implements techniques for sending notification data to a computing device via an intermediate sharing device, in accordance with one or more aspects of the present disclosure.

FIG. 5 is a flow diagram illustrating example operations of a server device that implements techniques for sending notification data to a computing device via an intermediate sharing device, in accordance with one or more aspects of the present disclosure. The techniques of FIG. 5 may be performed by one or more processors of a server device, such as server 17 illustrated in FIG. 1 and/or FIG. 3. For purposes of illustration, the techniques of FIG. 5 are described within the context of server 17 of FIG. 3, although computing devices having configurations different than that of server 17 may perform the techniques of FIG. 5. One or more of the actions described may be optional and not every step described/shown in the flow diagram of FIG. 5 is required to perform the techniques of this disclosure.

In accordance with techniques of this disclosure, distribution module 72 of server 17 may receive (100) notification data for a notification account that is associated with a computing device. For instance, the notification data may be an update from a gaming application. In such an example, distribution module 72 may receive the notification data from a device associated with the gaming application, such as a server that hosts the gaming application. Distribution module 72 may also receive information regarding the notification account for which the notification data is intended for. Distribution module 72 may store a database (e.g., device connection log 74) that associated the notification account with a specific computing device such that, upon receiving the notification data, distribution module 72 may perform a lookup in device connection log 74 to determine which computing device should receive the notification data.

Distribution module 72 may determine (102) that the computing device is currently offline. For instance, upon receiving the notification data from the local server that hosts the gaming application, distribution module 72 may attempt to send the notification data to the computing device using a wireless (e.g., cellular) connection or an Internet connection. However, the computing device may be currently unable to receive the notification data from server 17. For example, the computing device may be in a mode that blocks incoming signals from a cellular network or an Internet service, such as the commonly referenced "Airplane Mode". In other examples, the computing device may be geographically located in an area without cellular service or an Internet connection. In any case, distribution module 72 may determine that the computing device is currently unable to receive and process a signal from communication unit 62 in order to obtain the notification data if distribution module 72 does not receive an interaction event from the computing device within a predetermined response time threshold. The interaction event may be any type of confirmation from the computing device that indicates that the computing device received the notification data.

Responsive to determining that the computing device is currently offline, distribution module 72 may identify (104) a group of one or more sharing devices using device connection log 74. Distribution module 72 may select one of the sharing devices that is currently able to communicate with server 17 and send a notification package to the selected sharing device. The notification package may include the original notification data received by distribution module 72, an account identifier associated with the notification account, and a device identifier associated with the computing device. In the example of FIG. 5 upon determining that the computing device is currently offline, rather than waiting for the computing device to regain access to the cellular or Internet network, distribution module 72 may instead send (106) a notification package that includes the notification data to the sharing device identified from device connection log 74.

In selecting the sharing device, distribution module 72 may prune the group of one or more sharing devices based on various pieces of information so as to not overburden any particular sharing device or so as to most efficiently deliver the notification data to the computing device. For instance, distribution module 72 may prune the group of one or more sharing devices based at least in part on a number of notifications in a queue on server 17, a timestamp for each respective sharing device of the group of one or more sharing devices indicating when the respective sharing device last communicated with server 17, a number of notifications in a respective queue for each respective sharing device of the group of one or more sharing devices, or a number of instances within a predetermined amount of time that each respective sharing device of the group of one or more sharing devices sent notification data to the computing device. Distribution module 72 may prune sharing devices that have not recently been in communication with server 17, sharing devices with a large number of instances of notification data that must be delivered, or sharing devices that have not recently sent notification data to the intended recipient.

The group of one or more sharing devices may be a list stored in device connection log 74. Distribution module 72 may construct this list based on various identified sharing devices. For instance, distribution module 72 may receive a token from a sharing device. In some examples, the token may include comprises the device identifier associated with the computing device, the account identifier for the notification account associated with the computing device, and a device identifier for the sharing device. In other instances, the token may be a first token that only includes a device identifier for the sharing device. In such instances, distribution module 72 may further receive a second token from the sharing device that includes a device identifier for the computing device and an account identifier for the notification account associated with the computing device. Distribution module 72 may then concatenate the first token and the second token to produce a third token that includes each of the device identifier for the sharing device, the device identifier for the computing device, and the account identifier for the notification account associated with the computing device. In any case, distribution module 72 may extract the information from the received tokens and store the information in device connection log 74. Distribution module 72 may then select the sharing device from device connection log 74, where device connection log 74 lists all sharing devices that have previously exchanged data with the computing device.

At this point, in some instances, the sharing device may then be tasked with delivering the notification data to the computing device. In other instances, distribution module 72 may still attempt to send the notification data to the computing device. In such instances, distribution module 72 may implement a race condition on the notification data. Specifically, distribution module 72 may continue attempting to send the notification data to the computing device until either distribution module 72 successfully sends the notification data to the computing device or distribution module 72 receives an indication from the sharing device that the computing device has successfully received the notification data from the sharing device. Once either of these conditions occur, distribution module 72 may cease attempting to send the notification data to the intended recipient device.

In some examples, distribution module 72 may additionally send an expiration date for the notification data to the sharing device. The expiration date may indicate a time at which the sharing device will delete the notification data from an internal notification queue if the sharing device has not yet delivered the notification data to the computing device. In such examples, if the expiration date has passed and the sharing device has not yet delivered the notification data to the second computing device, the sharing device may proceed to delete the notification data from the internal notification queue. By including an expiration date, the sharing device is not burdened with storing the notification data for an indefinite amount of time. The expiration date may be an amount of time which it can be reasonably expected that the second computing device will, at some point, connect to the server device. For instance, the expiration date may be a day, three days, a week, or any other reasonably determined amount of time.

Figure 6:
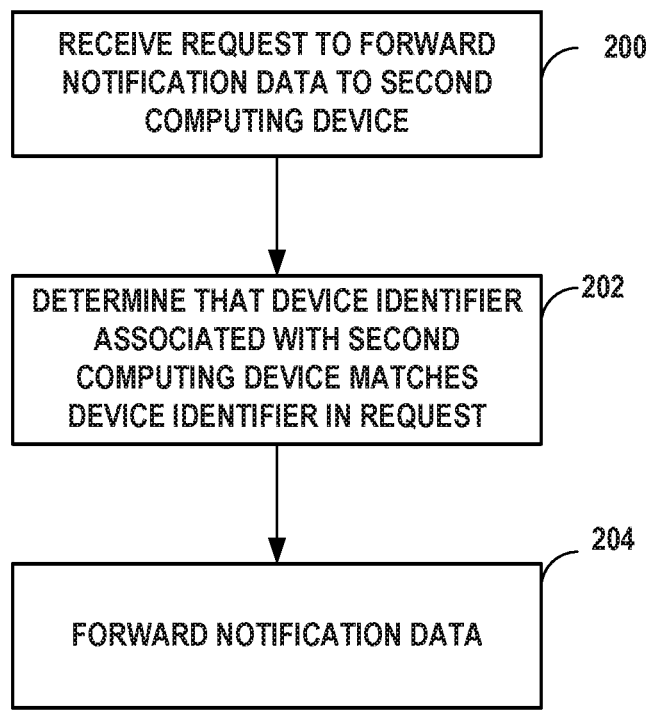
FIG. 6 is a flow diagram illustrating example operations of a sharing device that implements techniques for sending notification data received from a server device to a computing device, in accordance with one or more aspects of this disclosure.

FIG. 6 is a flow diagram illustrating example operations of a sharing device that implements techniques for sending notification data received from a server device to a computing device, in accordance with one or more aspects of this disclosure. The techniques of FIG. 4 may be performed by one or more processors of a computing device, such as computing device 4 illustrated in FIG. 1 and/or FIG. 2. For purposes of illustration, the techniques of FIG. 6 are described within the context of computing device 4 of FIG. 1, although computing devices having configurations different than that of computing device 4 may perform the techniques of FIG. 6. One or more of the steps described may be optional and not every step described/shown in the flow diagram of FIG. 6 is required to perform the techniques of this disclosure.

In accordance with techniques of this disclosure, communication module 10 may receive (200), via communication unit 6, a request to forward notification data to a second computing device from a server device. The request may include the notification data itself and a device identifier. For instance, communication module 10 may receive, via communication unit 6, notification data pertaining to a news alert from a news application for the second computing device. If the server device is not currently able to communicate with the second computing device for the purpose of sending the notification data directly to the second computing device, communication module 6 may instead receive the notification data on behalf of the second computing device. Communication module 10 may also receive a device identifier that indicates the computing device that is the intended recipient of the notification date (e.g., the second computing device). Upon receiving the request, communication module 10 may store the notification data and the device identifier in notification queue 8 until communication module 10 is able to forward the notification data to the second computing device.

Computing device 4 and the second computing device that is the intended recipient of the notification data may have exchanged data or connected via some form of non-Internet protocol at some point in the past. For instance, prior to receiving the request, communication module 10 may send data to the second computing device via the non-Internet protocol. This data may be a text message, video data, image data, or any other communication that indicates that computing device 4 and the second computing device may have been in the general vicinity of one another at some point and may again be in communication range of one another at some point in the future. During this data exchange, communication module 10 may receive a first token from the second computing device. The first token may include the device identifier for the second computing device and an account identifier for a notification account associated with the second computing device. Communication module 10 may then send identifier information to the server device. The identifier information may include the first token and a second token that includes a device identifier for computing device 4. In some examples, communication module 10 may combine the two tokens into a single token to form the identifier information. In other examples, communication module 10 may send the two tokens to the server device as separate data objects. The server device may use this identifier information to track that server device may send notification data for either computing device 4 or the second computing device to the other computing device and reasonably expect that the notification data will be delivered.

Communication module 10 may detect when communication unit 6 of computing device 4 is able to connect via the non-Internet protocol with the second computing device. Once computing device 4 and the second computing device are in communication with one another, communication module 10 may compare a device identifier associated with the second computing device with the device identifier included in the request received from the server device in order to determine (202) that the device identifiers match (202). This ensures that computing device 4 is sending the notification data to the correct recipient, as there may be examples where the server device utilizes computing device 4 to forward notification data to numerous recipient computing devices and communication module 10 stores numerous instances of notification data and device identifiers in notification queue 8. For instance, notification queue 8 may hold the news alert for the second computing device, a social networking update for a third computing device, and a video notification for a fourth computing device simultaneously.

Responsive to determining that the device identifier associated with the second computing device matches the device identifier included in the request from the server device, communication module 10 may forward (204) the notification data to the second computing device. For instance, communication module 10 may use communication unit 6 to determine whether the second computing device is within a communication range of computing device 4 for a communication protocol, such as a non-Internet protocol. When computing device 4 and the second computing device connect (e.g., the two devices are within the communication range for the non-Internet protocol and connect, either automatically or manually), communication module 10 may determine, using the device identifiers stored in notification queue 8, whether the second computing device is the intended recipient of the notification data received from the server device. Communication module 10 may send the notification data to the second computing device using the non-Internet protocol using communication unit 6. In some examples, the non-Internet protocol may be a Bluetooth® protocol or a near field communication protocol.

Even though the original notification data that the server device receives may include notification account information, communication module 10 may disregard the notification account information when forwarding the notification data to the second computing device. Since a single computing device may be associated with multiple different accounts, even within the same application or service (e.g., the second computing device may be associated with multiple subscriber accounts in the news application from which the notification data originates), the account information may be inconsequential to the delivery of the notification data itself. In order to efficiently deliver the notification data, communication module 10 may simply forward the notification data using communication unit 6 to the second computing device upon the affirmative comparison of the device identifiers.

In some examples, communication module 10 may record a timestamp associated with the notification data in notification queue 8. The timestamp may indicate a time when the notification data was received from the server device. In such examples, communication module 10 may send the timestamp to the second computing device with the notification data. The timestamp assists the second computing device in determining whether the notification data is still pertinent. For example, computing device 4 may be unaware of whether the second computing device has received notification data from the central server in the time since communication module 10 received the notification data. In such examples, when the second computing device receives the notification data from the first computing device, the second computing device may compare the timestamp of the notification data with an internally tracked time of the last instance of the second computing device connecting to the server device. If the timestamp of the notification data is more recent than the internally tracked time, then the second computing device may determine that the notification data is pertinent. If the timestamp is less recent than the internally tracked time, then the second computing device may disregard the received notification data.

In some examples, after sending the notification data to the second computing device, communication module 10 may receive an indication that the second computing device has received the notification data from communication module 10, such as a confirmation message. In such examples, communication module 10 may forward the indication to the server device. This enables the server device to be aware that communication module 10 completed the process of sending the notification data to the intended recipient.

In some examples, when forwarding the notification data to the second computing device, communication module 10 may forward the notification data to an intermediate computing device, which in turn forwards the notification data to the second computing device. Computing device 4 may be local host device in an office complex that is connected to the server device via an Internet connection. The user of the second computing device may, in certain non-limiting examples, be a spouse of a person who works at the office complex that houses computing device 4. In such examples, the server device may determine that the most optimal route of efficiently delivering the notification data to the second computing device during a business day is to send the notification data to the local host device in the office complex. The local host device in the office complex may then forward the notification data to a computing device used by the person who works at the office complex that houses the local host device (e.g., computing device 4). When the person who works at the office complex that houses the local host device returns home with their intermediate computing device, the intermediate computing device may forward the notification data to the intended recipient, or the second computing device used by the employee's spouse.

In some further examples, communication module 10 may receive, with the notification data, an expiration date for the notification data from the server device. The expiration date may indicate a time at which the communication module 10 will delete the notification data from notification queue 8 if the communication module 10 has not yet delivered the notification data to the second computing device. In such examples, responsive to determining that the expiration date has passed and that communication module 10 has not yet delivered the notification data to the second computing device, communication module 10 may proceed to delete the notification data from notification queue 8. By including an expiration date, computing device 4 is not burdened with storing the notification data for an indefinite amount of time. The expiration date may be an amount of time which it can be reasonably expected that the second computing device will, at some point, connect to the server device. For instance, the expiration date may be a day, three days, a week, or any other reasonably determined amount of time.

Example 1

A method comprising: receiving, by a server device, notification data for a notification account that is associated with a computing device; determining, by the server device, that the computing device is currently offline; and responsive to determining that the computing device is currently offline: identifying, by the server device, a group of one or more sharing devices; and sending, by the server device, a notification package to a sharing device of the group of one or more sharing devices, wherein the notification package includes the notification data, an account identifier associated with the notification account, and a device identifier associated with the computing device.

Example 2

The method of example 1, wherein determining that the computing device is currently offline comprises: sending, by the server device, the notification data to the computing device; and responsive to not receiving, by the server device, an interaction event from the computing device within a predetermined response time threshold, determining, by the server device, that the computing device is currently offline.

Example 3

The method of any of examples 1 or 2, further comprising: pruning, by the server device, the group of one or more sharing devices based at least in part on a number of notifications in a queue on the server device, a timestamp for each respective sharing device of the group of one or more sharing devices indicating when the respective sharing device last communicated with the server device, a number of notifications in a respective queue for each respective sharing device of the group of one or more sharing devices, or a number of instances within a predetermined amount of time that each respective sharing device of the group of one or more sharing devices that the respective sharing device sent notification data to the computing device.

Example 4

The method of any of examples 1-3, wherein identifying the group of one or more sharing devices comprises: identifying, by the server device, the sharing device; and constructing, by the server device, the group of one or more sharing devices to include the sharing device.

Example 5

The method of example 4, wherein identifying the sharing device comprises: receiving, by the server device, a token from the sharing device.

Example 6

The method of example 5, wherein the token comprises the device identifier associated with the computing device, the account identifier for the notification account associated with the computing device, and a device identifier for the sharing device.

Example 7

The method of example 5, wherein the token comprises a first token comprising a device identifier for the sharing device, and wherein identifying the sharing device further comprises: receiving, by the server device, a second token from the sharing device, wherein the second token comprises a device identifier for the computing device and an account identifier for the notification account associated with the computing device; and concatenating, by the server device, the first token and the second token to produce a third token, wherein the third token comprises the device identifier for the sharing device, the device identifier for the computing device, and the account identifier for the notification account associated with the computing device.

Example 8

The method of any of examples 1-7, wherein identifying the group of one or more sharing devices comprises: selecting, by the server device, the sharing device from a log that lists all sharing devices that have previously exchanged data with the computing device.

Example 9

The method of any of examples 1-8, further comprising: receiving, by the server device and from the sharing device, an indication that the computing device has received the notification data from the sharing device.

Example 10

The method of any of examples 1-9, further comprising: sending, by the server device, an expiration date for the notification data to the sharing device, wherein the expiration date indicates a time at which the sharing device will delete the notification data if the sharing device has not yet delivered the notification data to the computing device.

Example 11

A method comprising: receiving, by a first computing device and from a server device, a request to forward notification data to a second computing device, wherein the request includes the notification data and a device identifier; determining, by the first computing device, that a device identifier associated with the second computing device matches the device identifier included in the request; and responsive to determining, by the first computing device, that the device identifier associated with the second computing device matches the device identifier included in the request, forwarding, by the first computing device, the notification data to the second computing device.

Example 12

The method of example 11, further comprising: determining, by the first computing device, whether the second computing device is within a communication range of the first computing device; and responsive to determining that the second computing device is within the communication range of the first computing device and that the device identifier associated with the second computing device matches the device identifier included in the request: forwarding, by the first computing device, the notification data to the second computing device.

Example 13

The method of any of examples 11 or 12, wherein forwarding the notification data comprises: connecting, by the first computing device, to the second computing device via a non-Internet protocol; and sending, by the first computing device, the notification data to the second computing device over the non-Internet protocol.

Example 14

The method of example 13, wherein the non-Internet protocol comprises a Bluetooth® protocol or a near field communication protocol.

Example 15

The method of any of examples 11-14, further comprising: sending, by the first computing device and to the second computing device, a timestamp indicating a time when the notification data was received from the server device.

Example 16

The method of any of examples 11-15, further comprising: responsive to forwarding the notification data to the second computing device: receiving, by the first computing device, an indication that the second computing device has received the notification data from the first computing device; and forwarding, by the first computing device, the indication to the server device.

Example 17

The method of any of examples 11-16, further comprising: prior to receiving the request, sending, by the first computing device, data to the second computing device; receiving, by the first computing device, a first token from the second computing device, wherein the first token comprises the device identifier for the second computing device and an account identifier for a notification account associated with the second computing device; and sending, by the first computing device, identifier information to the server device, wherein the identifier information includes the first token and a second token comprising a device identifier for the first computing device.

Example 18

The method of any of examples 11-17, wherein forwarding the notification data to the second computing device comprises: forwarding, by the first computing device, the notification data to the second computing device via an intermediate computing device.

Example 19

The method of any of examples 11-18, further comprising: receiving, by the first computing device, an expiration date for the notification data from the server device, wherein the expiration date indicates a time at which the first computing device will delete the notification data if the first computing device has not yet delivered the notification data to the second computing device; and responsive to determining that the expiration date has passed and that the first computing device has not yet delivered the notification data to the second computing device, deleting, by the first computing device, the notification data from a memory of the first computing device.

Example 20

A system comprising: a sharing device of a group of one or more sharing devices; and a server device configured to: receive notification data for a notification account that is associated with a computing device; determine that the computing device is currently offline; and responsive to determining that the computing device is currently offline: identify the group of one or more sharing devices; and send a notification package to the sharing device, wherein the notification package includes the notification data, an account identifier associated with the notification account, and a device identifier associated with the computing device, wherein the sharing device is configured to: receive the notification package from the server device; and responsive to determining, by the sharing device, that a device identifier associated with the computing device matches the device identifier included in the notification package, forward the notification data to the computing device.

Example 21

A device comprising means for performing the method of any combination of examples 1-19.

Example 22

A computer-readable storage medium encoded with instructions that, when executed, cause at least one processor of a computing device to perform the method of any combination of examples 1-19.

Example 23

A device comprising at least one module operable by one or more processors to perform the method of any combination of examples 1-19.

Example 24

A computing device comprising: at least one processor; and a computer-readable storage device/medium storing instructions that, when executed by the at least one processor, cause the at least one processor to: receive notification data for a notification account that is associated with a computing device; determine that the computing device is currently offline; and responsive to determining that the computing device is currently offline: identify a group of one or more sharing devices; and send a notification package to a sharing device of the group of one or more sharing devices, wherein the notification package includes the notification data, an account identifier associated with the notification account, and a device identifier associated with the computing device.

Example 25

The computing device of example 24, wherein the instructions, when executed by the at least one processor, further cause the at least one processor to perform the method of any combination of examples 2-10.

Example 26

A computing device comprising: at least one processor; and a computer-readable storage device/medium storing instructions that, when executed by the at least one processor, cause the at least one processor to: receive, from a server device, a request to forward notification data to a second computing device, wherein the request includes the notification data and a device identifier; determine that a device identifier associated with the second computing device matches the device identifier included in the request; and responsive to determining that the device identifier associated with the second computing device matches the device identifier included in the request, forward the notification data to the second computing device.

Example 27

The computing device of example 26, wherein the instructions, when executed by the at least one processor, further cause the at least one processor to perform the method of any combination of examples 12-19.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method comprising:
receiving, by a server device and from a host device, notification data for a notification account that is associated with a computing device, wherein the notification data is associated with an application executable by the computing device;
determining, by the server device, that the computing device is currently offline; and
responsive to determining that the computing device is currently offline:
identifying, by the server device, a first sharing device by:
receiving, by the server device, a first token and a second token from the first sharing device, wherein the first token comprises the device identifier associated with the computing device, the account identifier for the notification account associated with the computing device, and a device identifier for the first sharing device, and wherein the second token comprises a device identifier for the computing device and an account identifier for the notification account associated with the computing device, and
concatenating, by the server device, the first token and the second token to produce a third token, wherein the third token comprises the device identifier for the first sharing device, the device identifier for the computing device, and the account identifier for the notification account associated with the computing device;
constructing, by the server device, a group of one or more sharing devices that includes the first sharing device, wherein each sharing device of the group of one or more sharing devices is configured to directly exchange data with the computing device; and
sending, by the server device, a notification package to the first sharing device of the group of one or more sharing devices, wherein the notification package includes the notification data, an account identifier associated with the notification account, and a device identifier associated with the computing device.

2. The method of claim 1, wherein determining that the computing device is currently offline comprises:
sending, by the server device, the notification data to the computing device; and
responsive to not receiving, by the server device, an interaction event from the computing device within a predetermined response time threshold, determining, by the server device, that the computing device is currently offline.

3. The method of claim 1, further comprising:
pruning, by the server device, the group of one or more sharing devices based at least in part on a number of notifications in a queue on the server device, a timestamp for each respective sharing device of the group of one or more sharing devices indicating when the respective sharing device last communicated with the server device, a number of notifications in a respective queue for each respective sharing device of the group of one or more sharing devices, or a number of instances within a predetermined amount of time that each respective sharing device of the group of one or more sharing devices that the respective sharing device sent notification data to the computing device.

4. The method of claim 1, wherein constructing the group of one or more sharing devices further comprises:
selecting, by the server device, the first sharing device from a log that lists all sharing devices that have previously exchanged data with the computing device.

5. The method of claim 1, further comprising:
receiving, by the server device and from the first sharing device, an indication that the computing device has received the notification data from the first sharing device.

6. The method of claim 1, further comprising:
sending, by the server device, an expiration date for the notification data to the first sharing device, wherein the expiration date indicates a time at which the first sharing device will delete the notification data if the first sharing device has not yet delivered the notification data to the computing device.

7. A system comprising:
a first sharing device of a group of one or more sharing devices; and
a server device configured to:
receive, from a host device, notification data for a notification account that is associated with a computing device, wherein the notification data is associated with an application executable by the computing device;
determine that the computing device is currently offline; and
responsive to determining that the computing device is currently offline:
identifying, by the server device, the first sharing device by:
receive a first token and a second token from the first sharing device, wherein the first token comprises the device identifier associated with the computing device, the account identifier for the notification account associated with the computing device, and a device identifier for the first sharing device, and wherein the second token comprises a device identifier for the computing device and an account identifier for the notification account associated with the computing device, and
concatenate the first token and the second token to produce a third token, wherein the third token comprises the device identifier for the first sharing device, the device identifier for the computing device, and the account identifier for the notification account associated with the computing device;
construct the group of one or more sharing devices that includes the first sharing device, wherein each sharing device of the group of one or more sharing devices is configured to directly exchange data with the computing device; and
send a notification package to the first sharing device, wherein the notification package includes the notification data, an account identifier associated with the notification account, and a device identifier associated with the computing device,
wherein the first sharing device is configured to:
receive the notification package from the server device; and
responsive to determining, by the first sharing device, that a device identifier associated with the computing device matches the device identifier included in the notification package, forward the notification data to the computing device.

* * * * *